US010834270B2

(12) United States Patent
Torikai

(10) Patent No.: US 10,834,270 B2
(45) Date of Patent: Nov. 10, 2020

(54) COMMUNICATION APPARATUS, COMMUNICATION METHOD TO ESTABLISH A COMMUNICATION CONNECTION TO AN EXTERNAL DEVICE

(71) Applicant: CANON KABUSHIKI KAISHA, Tokyo (JP)

(72) Inventor: Hiroyuki Torikai, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/418,694

(22) Filed: May 21, 2019

(65) Prior Publication Data

US 2019/0373115 A1 Dec. 5, 2019

(30) Foreign Application Priority Data

May 30, 2018 (JP) ................................. 2018-103895

(51) Int. Cl.
*H04N 1/00* (2006.01)
*H04N 5/232* (2006.01)
*G06K 19/06* (2006.01)
*H04W 4/80* (2018.01)

(52) U.S. Cl.
CPC ..... *H04N 1/00106* (2013.01); *G06K 19/06037* (2013.01); *H04N 1/00307* (2013.01); *H04N 5/232933* (2018.08); *H04N 5/232939* (2018.08); *H04N 2201/0084* (2013.01); *H04W 4/80* (2018.02)

(58) Field of Classification Search
None
See application file for complete search history.

(56) References Cited

U.S. PATENT DOCUMENTS

| 9,600,701 | B1* | 3/2017 | Chien | H04B 10/116 |
| 9,681,469 | B2* | 6/2017 | Hino | H04W 12/04 |
| 2005/0286463 | A1* | 12/2005 | Matsumoto | G06Q 20/202 |
| | | | | 370/328 |
| 2011/0050926 | A1* | 3/2011 | Asano | G06F 21/36 |
| | | | | 348/211.2 |
| 2012/0308003 | A1* | 12/2012 | Mukherjee | H04L 9/3247 |
| | | | | 380/243 |

(Continued)

FOREIGN PATENT DOCUMENTS

JP 2007-166577 A 6/2007

*Primary Examiner* — Cythia Segura
(74) *Attorney, Agent, or Firm* — Canon U.S.A., Inc., IP Division

(57) ABSTRACT

A communication apparatus includes a communication device that forms a wireless network as an access point, a code generator that generates a two-dimensional code, a display device, and a controller, where the controller, in a case the controller detects an instruction to transmit image data to an external apparatus, controls the communication device to form a wireless network as an access point, controls the code generator to generate a first two-dimensional code indicating information for connecting to the formed wireless network, and controls the display device to display the first two-dimensional code, and in a case the controller detects that the external apparatus connects to the wireless network using the first two-dimensional code, controls the code generator to generate a second two-dimensional code indicating information for accessing the image data to be transmitted, and controls the display device to display the second two-dimensional code.

13 Claims, 8 Drawing Sheets

(56) References Cited

U.S. PATENT DOCUMENTS

| | | | | |
|---|---|---|---|---|
| 2012/0325902 A1* | 12/2012 | Goyal | G06F 19/00 | 235/375 |
| 2014/0082703 A1* | 3/2014 | Zhang | H04L 63/10 | 726/4 |
| 2014/0115708 A1* | 4/2014 | Terwilliger | G06F 21/36 | 726/26 |
| 2014/0119234 A1* | 5/2014 | Kwon | H04W 48/16 | 370/254 |
| 2014/0120886 A1* | 5/2014 | Xu | G06Q 20/3276 | 455/414.1 |
| 2015/0264033 A1* | 9/2015 | Chen | H04W 76/10 | 709/227 |
| 2015/0365909 A1* | 12/2015 | Cacioppo | G09B 7/02 | 370/329 |
| 2016/0072553 A1* | 3/2016 | Tanji | H04W 4/80 | 455/41.1 |
| 2016/0078334 A1* | 3/2016 | Reccek, Jr. | G06Q 30/018 | 235/494 |
| 2016/0127892 A1* | 5/2016 | Huang | H04L 67/141 | 726/29 |
| 2016/0232393 A1* | 8/2016 | Nakajima | H04W 12/003 | |
| 2016/0373556 A1* | 12/2016 | Xu | H04L 67/02 | |
| 2017/0006146 A1* | 1/2017 | Homma | G06K 19/06037 | |
| 2017/0094703 A1* | 3/2017 | Matsuda | H04N 19/40 | |
| 2017/0155872 A1* | 6/2017 | Yan | H04N 7/163 | |
| 2017/0277496 A1* | 9/2017 | Mihira | H04W 8/005 | |
| 2018/0075156 A1* | 3/2018 | Broselow | G06K 19/06046 | |
| 2018/0249515 A1* | 8/2018 | Li | H04W 48/16 | |
| 2019/0007987 A1* | 1/2019 | Li | H04W 28/14 | |
| 2019/0190915 A1* | 6/2019 | Barrera | H04L 63/10 | |
| 2019/0227782 A1* | 7/2019 | Chakkaravarthi | G06F 8/65 | |
| 2019/0305825 A1* | 10/2019 | Tanji | G06F 3/1204 | |
| 2019/0306713 A1* | 10/2019 | Yanagisawa | H04W 88/02 | |
| 2019/0365356 A1* | 12/2019 | Kurita | H04L 67/12 | |

\* cited by examiner

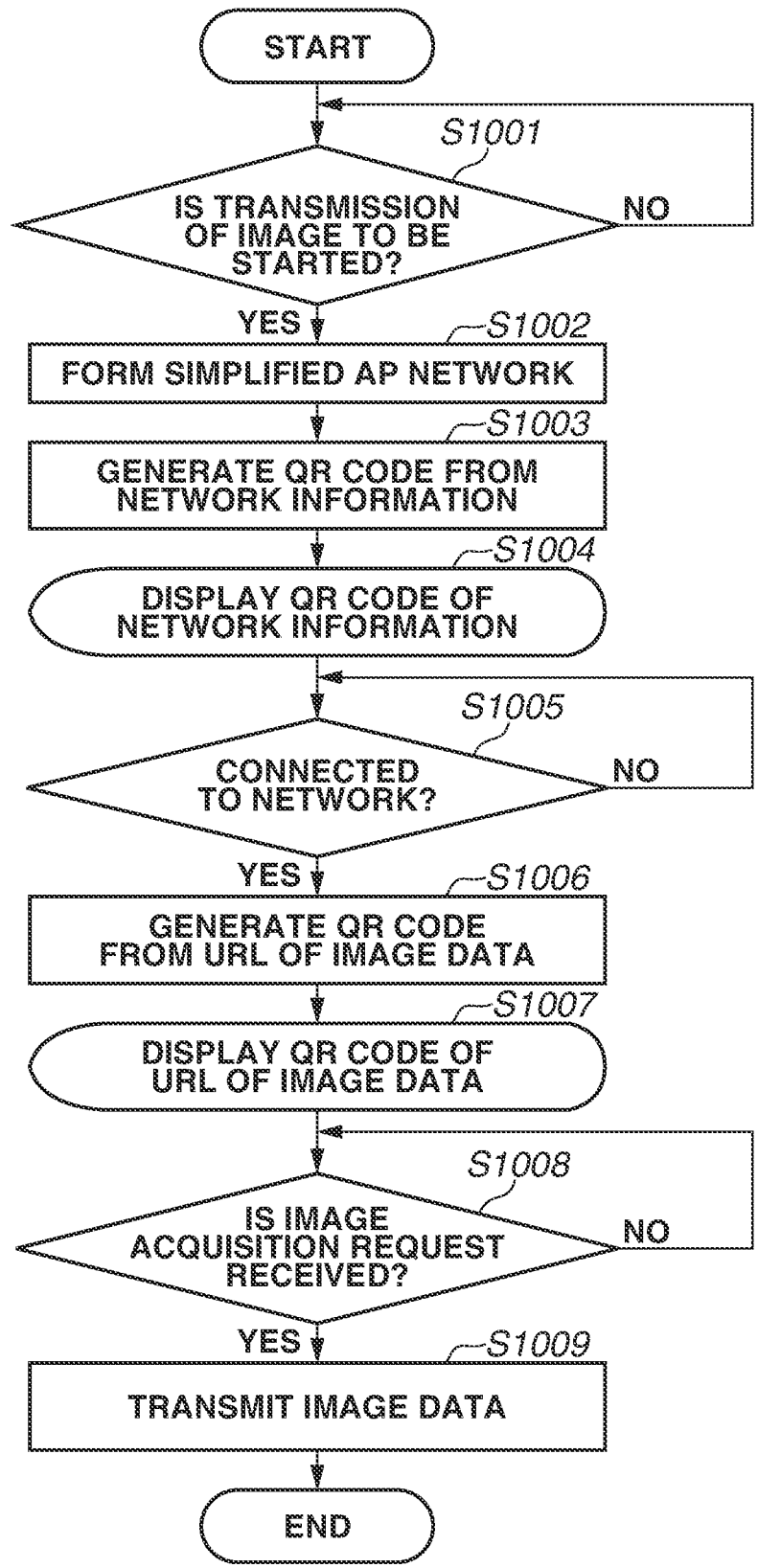

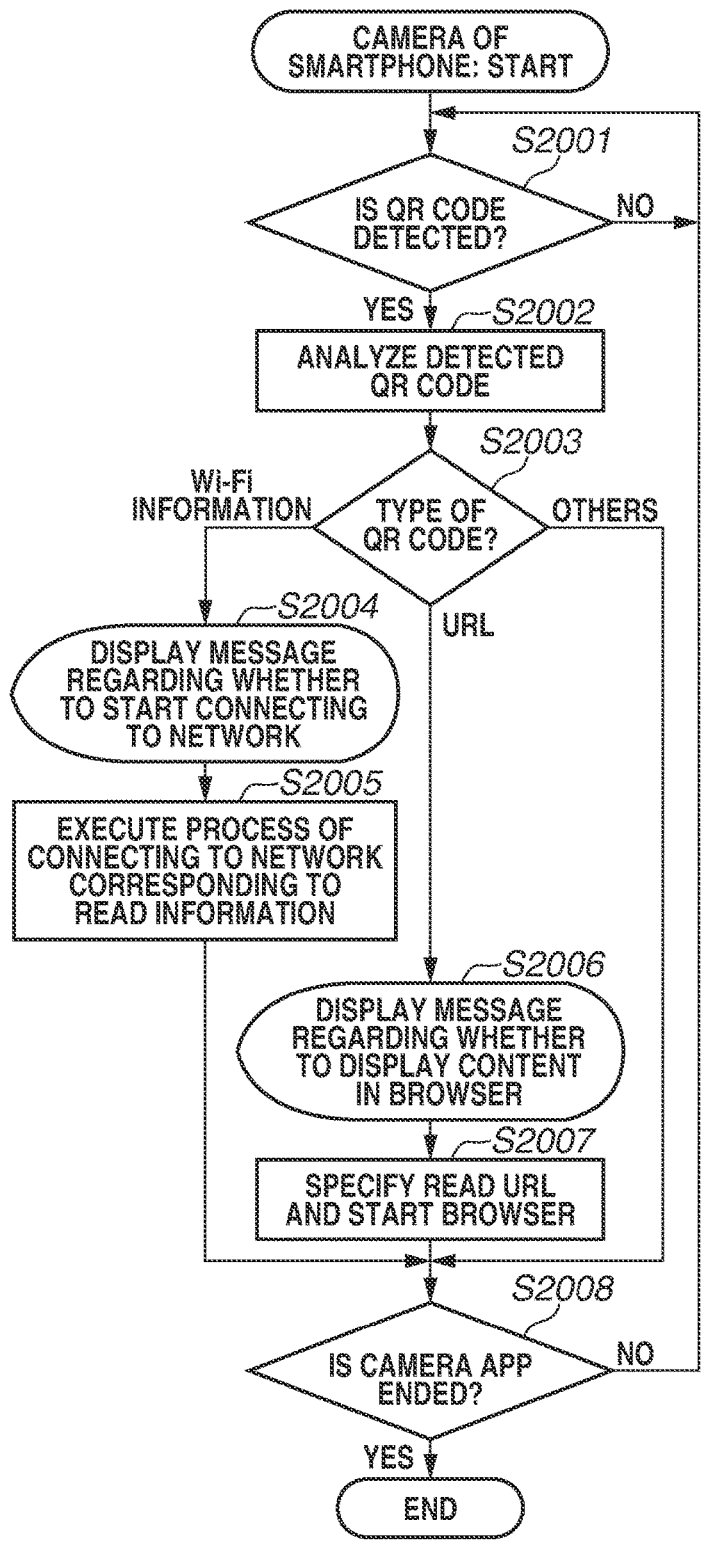
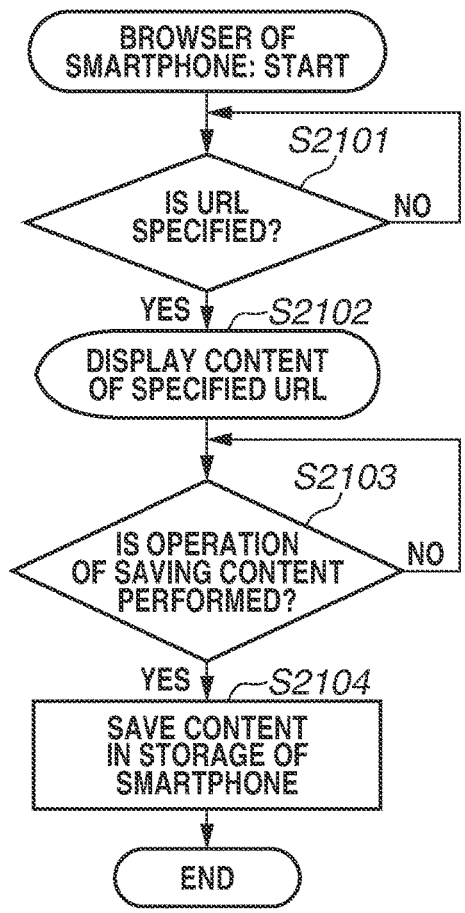

COMMUNICATION APPARATUS, COMMUNICATION METHOD TO ESTABLISH A COMMUNICATION CONNECTION TO AN EXTERNAL DEVICE

BACKGROUND

Field

The present disclosure relates to a communication apparatus for communicating with an external apparatus via wireless communication.

Description of the Related Art

A technique is known in which an imaging apparatus such as a digital camera has a wireless communication function and transmits image data stored in the imaging apparatus to an information terminal such as a mobile phone via wireless communication (discussed in the publication of Japanese Patent Application Laid-Open No. 2007-166577). Using this function, image data obtained by capturing an image can be transmitted from a camera to an external information terminal.

In recent years, digital cameras have increasingly become widespread, and it has become easier to wirelessly connect to an information terminal and transmit high-definition image data captured by a camera to the information terminal. Under such an environment, the opportunities to utilize images, such as to send an image captured by a digital camera to a friend or to post an image to a social networking service (SNS), is increasing.

However, to wirelessly connect an information terminal to a digital camera and transmit image data stored in the camera to the information terminal, a dedicated application for transmitting image data needs to be installed on the information terminal in advance.

SUMMARY OF THE INVENTION

Aspects of the present disclosure are directed to enabling the transmission of image data from a camera to an information terminal via wireless communication without using a dedicated application.

According to an aspect of the present disclosure, a communication apparatus includes a communication device configured to form a wireless network in which the communication apparatus is an access point, a code generator configured to generate a two-dimensional code, a display device, and a controller, wherein the controller in a case where the controller detects a transmission instruction to transmit image data to an external apparatus, controls the communication device to form a wireless network in which the communication apparatus is an access point, controls the code generator to generate a first two-dimensional code indicating information for connecting to the formed wireless network, and controls the display device to display the first two-dimensional code, and in a case where the controller detects that the external apparatus connects to the wireless network using the first two-dimensional code, controls the code generator to generate a second two-dimensional code indicating information for accessing the image data to be transmitted, and controls the display device to display the second two-dimensional code.

Further features will become apparent from the following description of exemplary embodiments with reference to the attached drawings.

BRIEF DESCRIPTION OF THE DRAWINGS

FIG. 7 is a flowchart illustrating an operation of the digital camera according to the exemplary embodiment.

FIGS. 8A and 8B are flowcharts illustrating an operation of the mobile phone according to the exemplary embodiment.

DESCRIPTION OF THE EMBODIMENTS

Exemplary embodiments will be described in detail below based on the attached drawings.

<Configuration of Digital Camera>

Figure 1A:
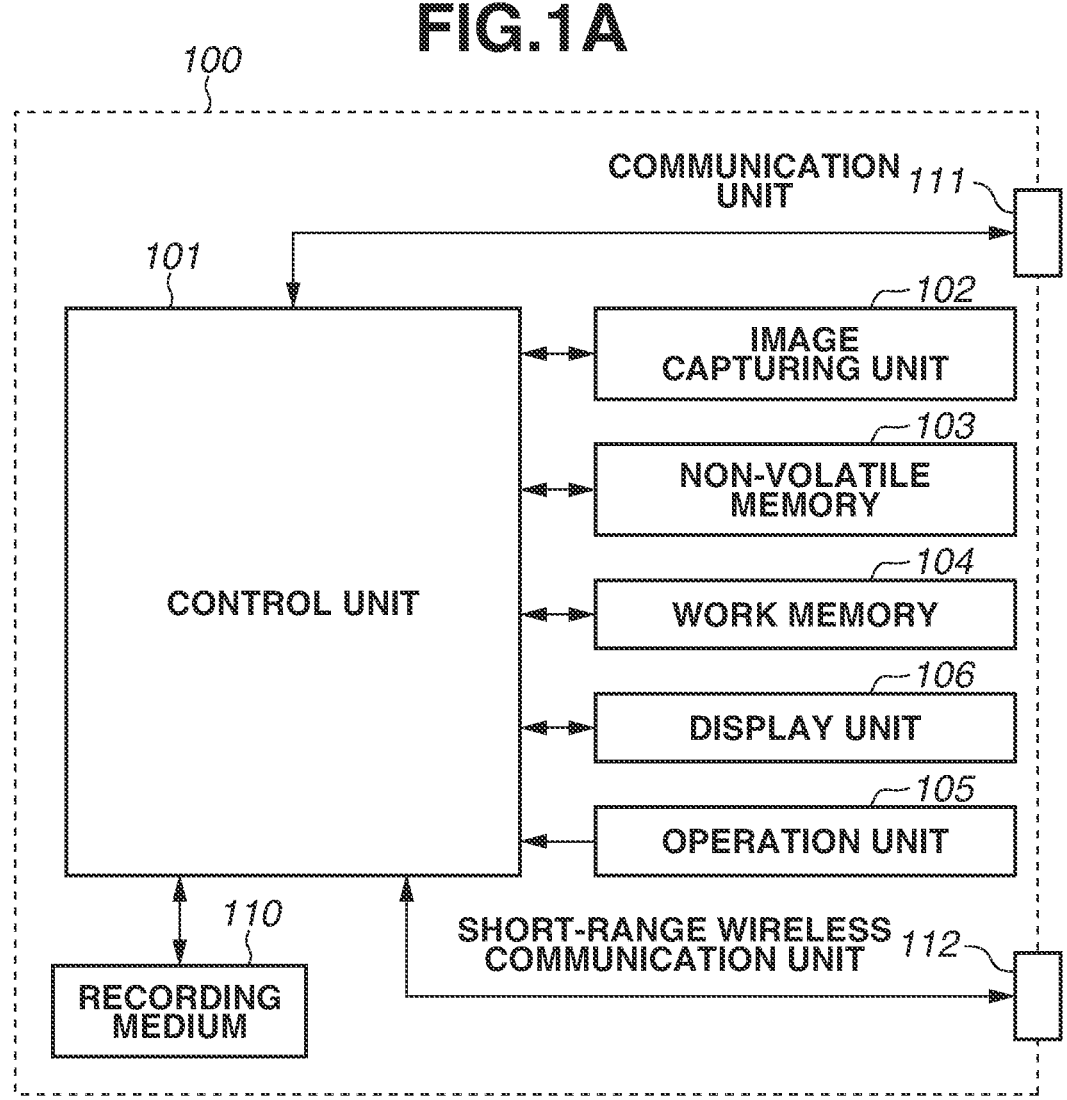
FIG. 1A is a block diagram illustrating a configuration of a digital camera according to an exemplary embodiment.

FIG. 1A is a block diagram illustrating an example of a configuration of a digital camera 100, which is an example of a communication apparatus according to the present exemplary embodiment. Although a digital camera is described as an example of the communication apparatus, the communication apparatus is not limited to the digital camera. The communication apparatus can be an information processing apparatus such as a mobile media player, a tablet device, or a personal computer.

A control unit 101 controls the components of the digital camera 100 according to an input signal and a program described below. Instead of the control unit 101 controlling the entirety of the digital camera 100, a plurality of pieces of hardware can share processing, thereby controlling the entirety of the digital camera 100.

An image capturing unit 102 includes, for example, an optical lens unit, an optical system for controlling the stop, the zoom, and the focus, and an image sensor. The image sensor converts light incident on the image sensor through the optical lens unit into an electrical video signal. Generally, a complementary metal-oxide-semiconductor (CMOS) or a charge-coupled device (CCD) is used as the image sensor.

The image capturing unit 102 is controlled by the control unit 101 so that the image sensor converts a formed image of object light into an electric signal, and the image capturing unit 102 performs a noise reduction process on the electric signal and outputs image data as digital data. The digital camera 100 according to the present exemplary embodiment records the image data in a recording medium 110 in compliance with, for example, the Design Rule for Camera File system (DCF) standard.

A non-volatile memory 103 is an electrically erasable and recordable non-volatile memory and stores, for example, a program described below to be executed by the control unit 101.

A work memory 104 is used as, for example, a buffer memory for temporarily storing image data captured by the image capturing unit 102, an image display memory for a display unit 106, and a work area for the control unit 101.

An operation unit 105 receives, from a user, an instruction to operate the digital camera 100. The operation unit 105 includes, for example, a power button for the user to provide an instruction to turn on or off the digital camera 100, a release switch for providing an instruction to capture an image, and a reproduction button for providing an instruction to reproduce image data. The operation unit 105 also includes operation members such as a connection button for wirelessly connecting to an external information terminal via a communication unit 111 described below and starting to communicate with the external information terminal.

The operation unit 105 can include a touch panel formed on the display unit 106 described below. The release switch includes switches SW1 and SW2. When the release switch enters a so-called half press state, the switch SW1 is turned on. Consequently, the operation unit 105 receives an instruction to make an image capturing preparation such as an autofocus (AF) process, an automatic exposure (AE) process, an automatic white balance (AWB) process, or a pre-flash (EF) process. When the release switch enters a so-called full press state, the switch SW2 is turned on. Consequently, the operation unit 105 receives an instruction to capture an image.

The display unit 106 displays a viewfinder image when an image is captured, captured image data for reproduction, and characters for performing an interactive operation with the user. The display unit 106 does not necessarily need to be integrated with the digital camera 100. The digital camera 100 only needs to be able to connect to the display unit 106 regardless of whether display unit 106 is internal or external to the digital camera 100 and have at least a display control function for controlling the display of the display unit 106. For example, the control unit 101 can be configured to have the display control function and the control unit 101 functions as a display control unit.

The recording medium 110 records image data output from the image capturing unit 102. The recording medium 110 can be attachable to and detachable from the digital camera 100, or can integrated with the digital camera 100. In other words, the digital camera 100 only needs to be able to access the recording medium 110.

The communication unit 111 is an interface for wirelessly connecting to an information terminal as an external apparatus. The digital camera 100 according to the present exemplary embodiment can transmit and receive image data to and from the information terminal via the communication unit 111. For example, the digital camera 100 can transmit image data generated by the image capturing unit 102 to the information terminal via the communication unit 111. The information terminal can control, via the communication unit 111, the image capturing unit 102 to capture an image. In the present exemplary embodiment, the communication unit 111 includes an interface for communicating with the information terminal via a wireless local area network (LAN) compliant with the Institute of Electrical and Electronics Engineers (IEEE) 802.11 standard. The control unit 101 controls the communication unit 111, thereby achieving wireless communication with the information terminal.

A short-range wireless communication unit 112 includes an antenna for wireless communication, and a modulation/demodulation circuit for processing a wireless signal and a communication controller. The short-range wireless communication unit 112 outputs a modulated wireless signal from the antenna and demodulates a wireless signal received by the antenna, thereby achieving short-range wireless communication compliant with the IEEE 802.15 standard (i.e., Bluetooth®).

In the present exemplary embodiment, Bluetooth® communication employs Bluetooth® Low Energy version 4.0, which consumes less power than Bluetooth®. The range where communication can be performed in Bluetooth® Low Energy communication is smaller (i.e., the distance that the communication can be reached is shorter) than that in wireless LAN communication. The communication rate of Bluetooth® Low Energy communication is lower than that of wireless LAN communication. Power consumption in Bluetooth® Low Energy communication is lower than that in wireless LAN communication. The digital camera 100 can transmit and receive data to and from the external apparatus via the short-range wireless communication unit 112. For example, the information terminal can control, via the communication unit 111, the image capturing unit 102 of the digital camera 100 to capture an image. However, since the communication rate is lower, image data generated by the image capturing unit 102 is not transmitted.

The communication unit 111 of the digital camera 100 has an access point (AP) mode where the digital camera 100 operates as an access point in an infrastructure mode, and a client (CL) mode where the digital camera 100 operates as a client in the infrastructure mode.

The digital camera 100 causes the communication unit 111 to operate in the CL mode and thereby can operate as a CL device in the infrastructure mode. If the digital camera 100 operates as the CL device, the digital camera 100 connects to an AP device in the vicinity of the digital camera 100 and thereby can participate in a network formed by the AP device.

The digital camera 100 causes the communication unit 111 to operate in the AP mode and thereby can also operate as a simplified AP that is a type of AP having limited functions. If the digital camera 100 operates as the simplified AP, the digital camera 100 forms a wireless network using the digital camera 100 itself as an access point. An apparatus in the vicinity of the digital camera 100 can recognize the digital camera 100 as an AP device and participate in the network formed by the digital camera 100. As described above, a program to operate the digital camera 100 is stored in the non-volatile memory 103.

The digital camera 100 operating in the AP mode is a simplified AP that does not have a gateway function for transferring data received from a CL device to an Internet provider or the like. Thus, even if the digital camera 100 receives data from another apparatus participating in the network formed by the digital camera 100, the digital camera 100 cannot transfer the data to a network such as the Internet.

Figure 1B:
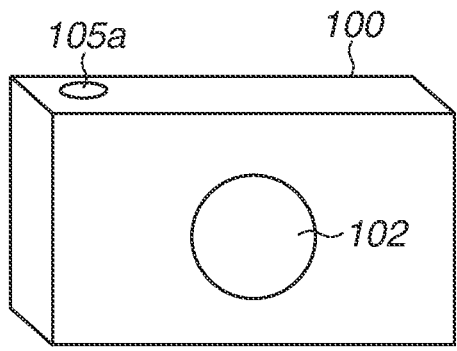
FIGS. 1B and 1C are diagrams illustrating an external appearance of the digital camera according to an exemplary embodiment.
Figure 1C:
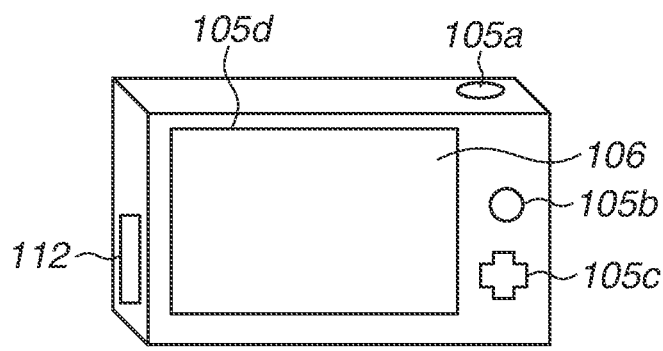

Next, the external appearance of the digital camera 100 is described. FIGS. 1B and 1C are diagrams illustrating an example of the external appearance of the digital camera 100.

A release switch 105a, a reproduction button 105b, a direction key 105c, and a touch panel 105d are the operation members included in the operation unit 105 described above. The display unit 106 displays a reproduced image obtained as a result of the image capturing unit 102 capturing an image. The digital camera 100 includes the antenna of the short-range wireless communication unit 112 on the side surface of the camera housing. The short-range wireless communication unit 112 of the digital camera 100 is brought close to a short-range wireless communication unit 112 of another device at a certain distance, whereby the digital camera 100 can establish short-range wireless communication with the other device. Consequently, the digital camera 100 can communicate with another device in a contactless manner not via a cable and also limit a communication partner according to the user's intention.

The digital camera 100, based on the control unit 101 executing a program stored in the non-volatile memory 103, can function as a web server that releases image data to the public as its content. Similarly, the digital camera 100, based on the control unit 101 executing a program stored in the non-volatile memory 103, executes a code generation function for generating a two-dimensional code indicating predetermined information. As an example, a case will be described where a Quick Response code (QR Code®) is used as the two-dimensional code.

The above is the description of the digital camera 100.

<Configuration of Mobile Phone>

Figure 2A:
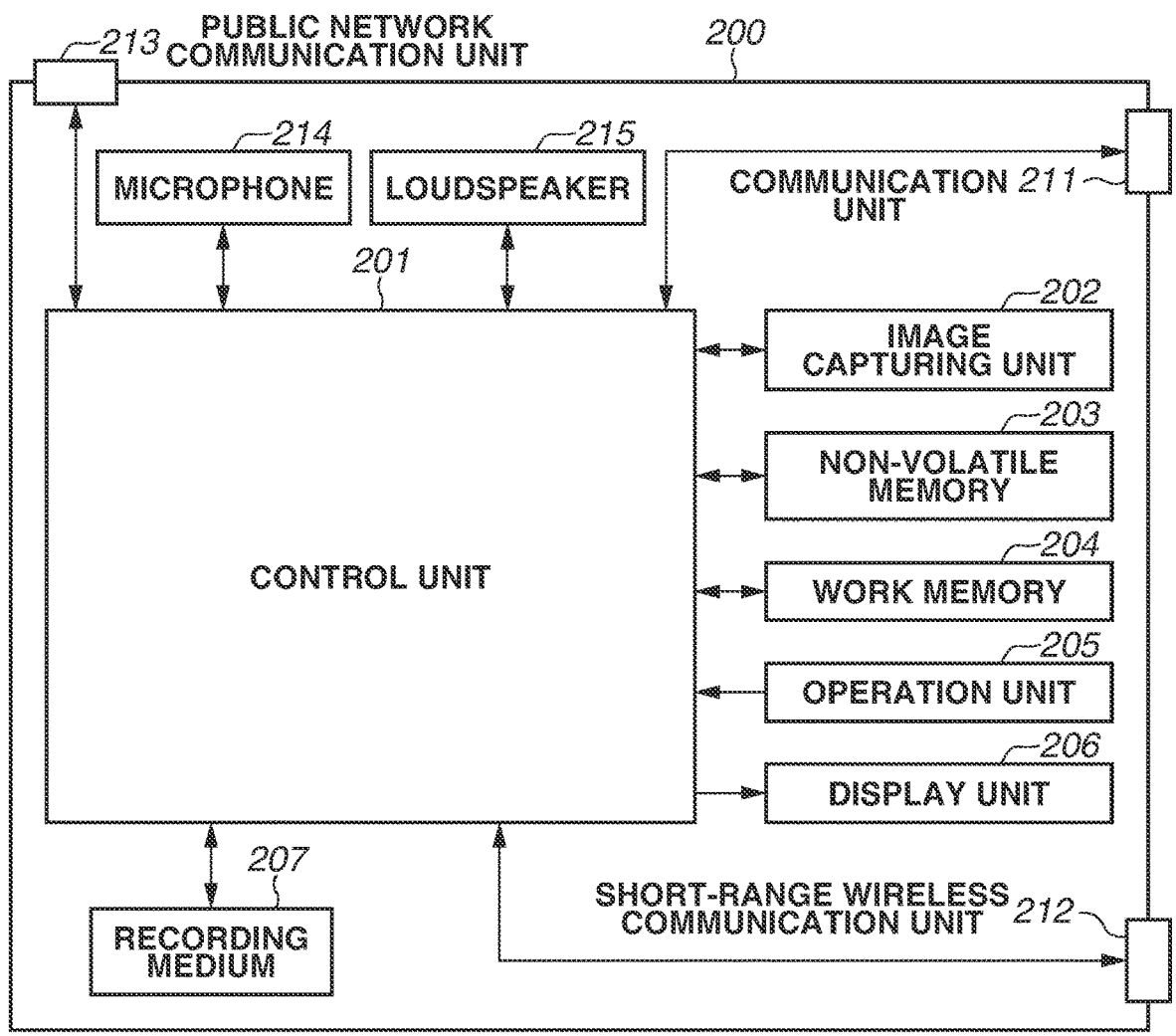
FIG. 2A is a block diagram illustrating a configuration of a mobile phone according to the exemplary embodiment.

FIG. 2A is a block diagram illustrating an example of the configuration of a mobile phone 200, which is an example of an information terminal according to the present exemplary embodiment. While a mobile phone is described as an example of the information terminal, the information terminal is not limited to this. The information terminal can be, for example, a digital camera, a tablet device, a smartphone, or a personal computer having a wireless communication function.

A control unit 201 controls the components of the mobile phone 200 based on an input signal and a program described below. Instead of the control unit 201 controlling the entirety of the mobile phone 200, a plurality of pieces of hardware can share relevant processing, thereby controlling the entirety of the mobile phone 200.

An image capturing unit 202 converts an image of object light formed by a lens included in the image capturing unit 202 into an electric signal, performs a noise reduction process on the electric signal, and outputs image data as digital data. The captured image data is stored in a buffer memory, then subjected to a predetermined calculation by the control unit 201, and recorded in a recording medium 207.

A non-volatile memory 203 is an electrically erasable and recordable non-volatile memory. The non-volatile memory 203 stores an operating system (OS), which is basic software to be executed by the control unit 201, and an application that cooperates with the OS to achieve an applicative function. The non-volatile memory 203 stores a camera application (hereinafter referred to simply as a "camera app").

A work memory 204 is used as, for example, an image display memory for a display unit 206 and a work area for the control unit 201.

An operation unit 205 receives an instruction from a user to operate the mobile phone 200. The operation unit 205 includes, for example, a power button for the user to provide an instruction to turn on or off the mobile phone 200, and operation members such as a touch panel formed on the display unit 206.

The display unit 206 displays, for example, image data, and characters for performing an interactive operation with the user. The display unit 206 does not necessarily need to be integrated with the mobile phone 200. The mobile phone 200 only needs to be able to connect to the display unit 206 and include at least a display control function for controlling the display of the display unit 206.

The mobile phone 200 includes as one of the operation members of the operation unit 205 a touch panel that detects contact with the display unit 206. The touch panel and the display unit 206 are configured in an integrated manner. For example, the touch panel is configured so that the transmittance of light does not hinder the display of the display unit 206. The touch panel is attachable to an upper layer of the display surface of the display unit 206. Input coordinates on the touch panel are associated with display coordinates on the display unit 206. Consequently, it is possible to configure a graphical user interface (GUI) functioning as if the user can directly operate a screen displayed on the display unit 206. In the touch panel, any type of touch detection method can be used, such as a resistive method, a capacitive method, a surface acoustic wave method, an infrared method, an electromagnetic induction method, an image recognition method, or a photosensor method.

The control unit 201 can detect the following operations on the touch panel.
(1) Bringing a user's finger or a pen into contact with the touch panel (hereinafter referred to as a "touch-down").
(2) Bringing the user's finger or the pen into contact with the touch panel (hereinafter referred to as a "touch-on").
(3) Moving the user's finger or the pen while maintaining the user's finger or the pen in contact with the touch panel (hereinafter referred to as a "move").
(4) Removing the user's finger or the pen that is in contact with the touch panel from the touch panel (hereinafter referred to as a "touch-up").
(5) Nothing is in contact with the touch panel (hereinafter referred to as a "touch-off").

The display unit 206 acquires information regarding the operations and the position coordinates where the user's finger or the pen is in contact with the touch panel. Then, the display unit 206 notifies the acquired information to the control unit 201. Based on the notified information, the control unit 201 determines what operation has been performed on the touch panel. In a case of a move, the control unit 201 can also determine, based on changes in the position coordinates, the moving direction of the user's finger or the pen moving on the touch panel with respect to each of the vertical and horizontal components on the touch panel. The user sequentially performing a touch-down, a certain move, and a touch-up on the touch panel is regarded as the user drawing a stroke. Hereinafter, the operation of quickly drawing a stroke will be referred to as a "flick". A flick is the operation of quickly moving the user's finger or the pen by some distance while the user's finger remains touching the touch panel, and then removing the user's finger or the pen from the touch panel immediately after the quick movement. When a move performed by a predetermined distance or more at a predetermined speed or more is detected, and a touch-up is detected immediately after the move, the control unit 201 determines that a flick has been performed. When a move performed by a predetermined distance or more at less than a predetermined speed is detected, the control unit 201 determines that a drag has been performed.

The recording medium 207 records an image output from the image capturing unit 202. The recording medium 207 can be attachable to and detachable from the mobile phone 200 or can be integrated with the mobile phone 200. The mobile phone 200 only needs to be able to access the recording medium 207.

A communication unit 211 is an interface for wirelessly connecting to and communicating with an information terminal as an external apparatus. The mobile phone 200 can transmit data to and receive data from the digital camera 100 via the communication unit 211. The communication unit 211 is an antenna, and the control unit 201 can connect to the digital camera 100 via the antenna.

The connection to the digital camera 100 can be a direct connection or a connection via an access point. As a protocol for communicating the data, for example, Picture Transfer Protocol over Internet Protocol (PTP/IP) via a wireless LAN can be used. The communication with the digital camera 100 is not limited to the protocol. For example, the communication unit 211 can include a wireless communication module such as an infrared communication module, a Bluetooth® communication module, or a Wireless Universal Serial Bus (USB) communication module.

A short-range wireless communication unit 212 includes an antenna for wireless communication, and a modulation/demodulation circuit and a communication controller for processing a wireless signal. The short-range wireless communication unit 212 outputs a modulated wireless signal from the antenna and demodulates a wireless signal received by the antenna, thereby achieving short-range wireless communication compliant with Bluetooth®. In the present exemplary embodiment, similarly to the configuration of the digital camera 100, Bluetooth® communication employs Bluetooth® Low Energy, which consumes less power than Bluetooth®.

To establish short-range wireless communication with the digital camera 100, the mobile phone 200 first needs to connect to the short-range wireless communication unit 112 of the digital camera 100 via a pairing operation for a one-to-one connection in short-range wireless communication. In the pairing operation, the digital camera 100 operates as a peripheral device in Bluetooth® Low Energy and, by using the short-range wireless communication unit 112, periodically transmits a signal for notifying its presence to other devices in the vicinity.

The mobile phone 200 operates as a central device and performs a scan operation using the short-range wireless communication unit 212. Consequently, the mobile phone 200 receives the advertise signal from the digital camera 100, thereby finding the digital camera 100. Upon finding the digital camera 100, the mobile phone 200 makes a participation request by an initiate operation, thereby establishing a connection for short-range wireless communication.

A public network communication unit 213 is an interface used to perform public wireless communication. The mobile phone 200 enables a telephone call with another device via the public network communication unit 213. At this time, the control unit 201 achieves the telephone call by inputting and outputting sound signals via a microphone 214 and a loudspeaker 215. The public network communication unit 213 is an antenna, and the control unit 201 can connect to a public network via the antenna. A single antenna can be used both as the communication unit 211 and the public network communication unit 213.

Figure 2B:
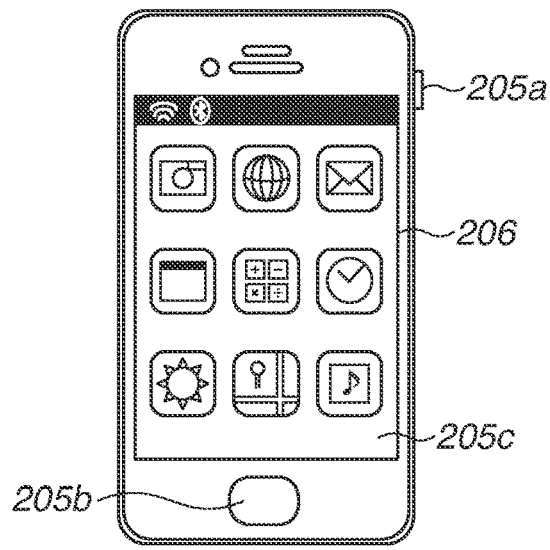
FIG. 2B is a diagram illustrating an external appearance of the mobile phone according to the exemplary embodiment.

Next, the external appearance of the mobile phone 200 is described. FIG. 2B is a diagram illustrating an example of the external appearance of the mobile phone 200. A power button 205a, a home button 205b, and a touch panel 205c are the operation members included in the operation unit 205. The home button 205b is pressed by the user to suspend an application that is being executed, and display on the display unit 206 a home screen where another application can be selected.

In the mobile phone 200, a standard camera app is installed. The camera app automatically detects a QR Code® from a captured object and analyzes the QR Code® to obtain character strings. The mobile phone 200 can recognize, from the character strings, Wi-Fi® network information or a Uniform Resource Locator (URL) as information for accessing data.

If the mobile phone 200 recognizes the detected QR Code® as Wi-Fi® network information, the communication unit 211 of the mobile phone 200 is used to participate in the wireless network formed by the digital camera 100 and perform wireless connection. If the mobile phone 200 recognizes the detected QR Code® as the URL of image data, a browser app installed on the mobile phone 200 is launched and a predetermined URL is accessed to acquire desired image data.

In a case where the standard camera app is not installed on the mobile phone 200, a versatile camera app is installed, thereby enabling the above-described processing.

The above is the description of the mobile phone 200.

Figure 3:
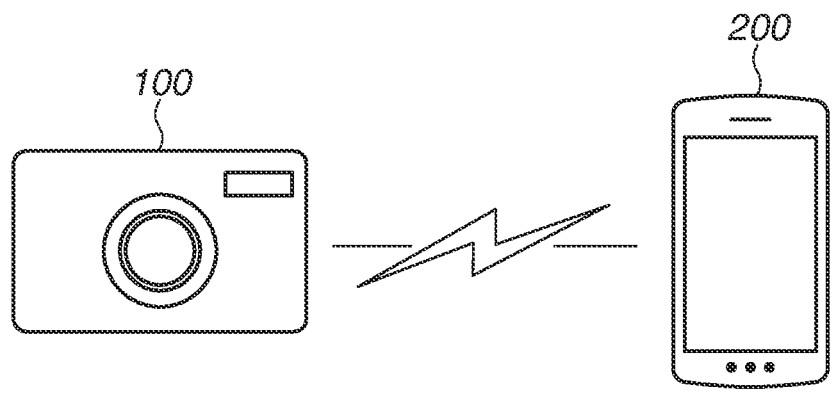
FIG. 3 is a diagram illustrating a network configuration according to the exemplary embodiment.

FIG. 3 is a diagram illustrating a connection between the digital camera 100 and the mobile phone 200 according to the present exemplary embodiment.

As illustrated in FIG. 3, the digital camera 100 and the mobile phone 200 are directly connected together. The digital camera 100 operates as a simplified AP and forms a wireless LAN network, and begins periodically transmitting a beacon signal. The mobile phone 200 detects the beacon signal and participates in the wireless LAN network formed by the digital camera 100. Both the digital camera 100 and the mobile phone 200 find the other device and acquire the capabilities of the other device, thereby establishing communication and entering the state where the digital camera 100 and the mobile phone 200 can transmit and receive data to and from each other.

<Issue of System Configuration>

Figure 4A:
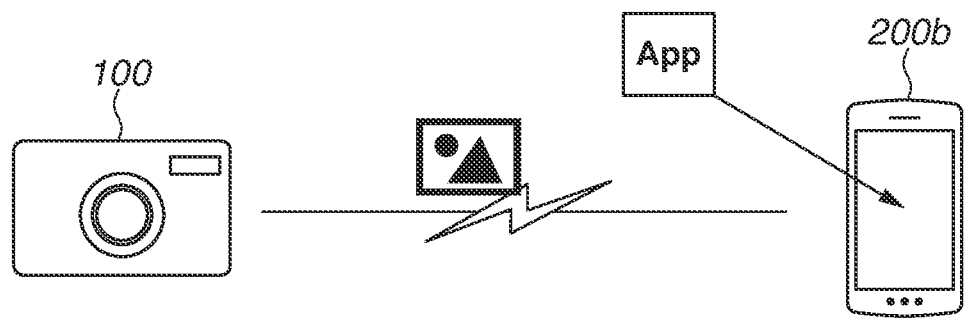
FIGS. 4A and 4B are diagrams illustrating an issue of a conventional configuration.
Figure 4B:
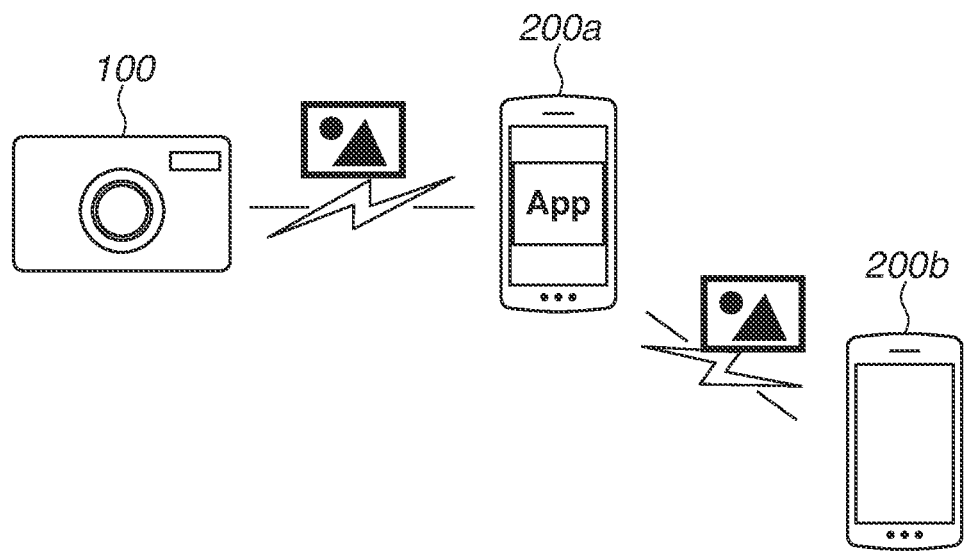

FIGS. 4A and 4B are examples of system diagrams illustrating configurations in a case where, in a conventional connection between a digital camera and a mobile phone, an image captured by a camera is transmitted to a mobile phone where the owner of the mobile phone is different than the owner of the camera.

As described above, in order to connect a mobile phone to a digital camera, transfer an image in the camera to the mobile phone, and save the image in the mobile phone, a dedicated application needs to be installed on the mobile phone in advance. While the dedicated application is typically installed on a mobile phone owned by the same person who owns the digital camera, the dedicated application may not necessarily be installed on a mobile phone owned by a different person. To transmit image data recorded in the digital camera to a mobile phone on which the dedicated application is not installed, it is necessary to employ one of the following configurations. For discussion purposes, one of the mobile phones in the following configurations is owned by a friend of the camera owner.

In the example illustrated in FIG. 4A, the dedicated application is installed on a mobile phone 200b owned by the friend, and a digital camera 100 and the mobile phone 200b are directly connected together. In this case, even if the friend does not wish to install an application, the friend needs to install the dedicated application in advance. In a case where a connection operation for connecting the digital camera 100 and the mobile phone 200b is cumbersome, and the user is particularly unaccustomed to the connection operation, the user is subjected to stress. There is also a possibility that the mobile phone 200b can also access private image data other than image data to be transmitted that is recorded in the digital camera 100.

In the example illustrated in FIG. 4B, a mobile phone 200a of the user on which the dedicated application is already installed is connected to the digital camera 100, and the mobile phone 200a acquires image data to be transmitted and saves the image data once into the mobile phone 200a. Then, the mobile phone 200a of the user transfers the image data to be transmitted to the mobile phone 200b of the friend. In this case, while the user only wishes to send the image data to the mobile phone 200b of the friend, the user needs to also save the image data on the mobile phone 200a of the user. The user needs to determine a method for transmitting the image data from the user's mobile phone 200a to the friend's mobile phone 200b. If the image data can be transmitted via email or a social networking service (SNS), there is no need to determine the transmission method. If, however, the friend is not so familiar with the user, the user needs to obtain an email address or an SNS account or consider another method for transmitting and receiving data between the mobile phones.

FIGS. 5A to 5E are system configuration diagrams schematically illustrating processing steps for establishing a connection between the digital camera 100 and the mobile phone 200 and transmitting an image between them.

Figure 5A:
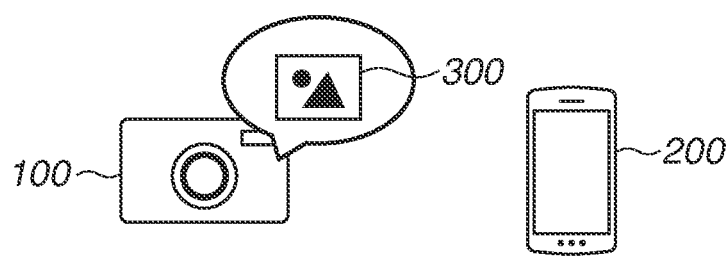
FIGS. 5A to 5E are flow diagrams schematically illustrating a process of transmitting an image according to the exemplary embodiment.

FIG. 5A schematically illustrates the state where image data captured by the digital camera 100 and recorded in the recording medium 110 is reproduced on the display unit 106. In this state, the digital camera 100 and the mobile phone 200 are not yet connected together. When the user operates the digital camera 100, thereby specifying image data 300 to be transmitted to the mobile phone 200 and providing a transmission instruction to transmit the image data 300, the state proceeds to the state in FIG. 5B. For example, while desired image data is displayed on the display unit 106, the user specifies the desired image data by performing the operation of touching the display unit 106, and thereby can specify the image data 300 to be transmitted. The digital camera 100 can interpret the specifying as a transmission instruction to transmit the image data 300.

Figure 5B:
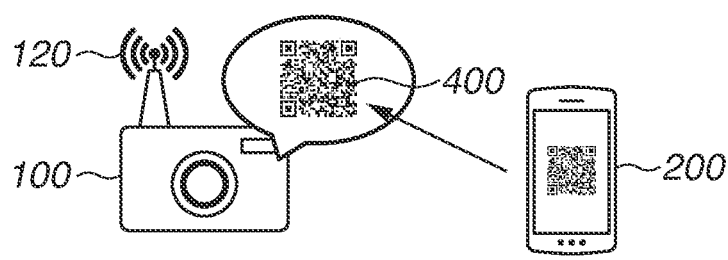

In FIG. 5B, the digital camera 100 starts a simplified AP 120 and forms a network. The simplified AP 120 schematically illustrates the network. The digital camera 100 starts the communication unit 111 as the simplified AP 120 and forms a wireless network. The digital camera 100 also generates a QR Code® 400 (i.e., a first two-dimensional code) from network information regarding the simplified AP 120. The digital camera 100 displays the QR Code® 400 on the display unit 106. The QR Code® 400 does not need to be displayed on the display unit 106 built into the digital camera 100, but can be displayed on an external display device.

The network information included in the QR Code® 400 includes a Service Set Identifier (SSID), which is Wi-Fi® network identification information regarding the simplified AP 120, an encryption type, and a password. The network information can be partial information excluding information of which the mobile phone 200 is already notified. In response to this, the user operates the mobile phone 200, thereby starting the standard camera app or the versatile camera app. Then, the user holds the image capturing unit 202 over the display unit 106 of the digital camera 100, thereby reading the QR Code® 400. The mobile phone 200 analyzes the read QR Code® 400 and recognizes the Wi-Fi® network information. Consequently, the state illustrated in FIG. 5B proceeds to a state illustrated in FIG. 5C.

Figure 5C:
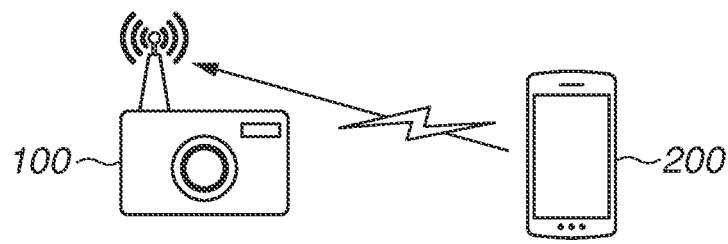

In FIG. 5C, the mobile phone 200 participates in the Wi-Fi® network of the simplified AP 120 formed by the digital camera 100 and establishes a wireless connection. The digital camera 100 detects that the mobile phone 200 is connected to the Wi-Fi® network of the simplified AP 120 formed by the digital camera 100. Then, the state illustrated in FIG. 5C proceeds to a state illustrated in FIG. 5D.

Figure 5D:
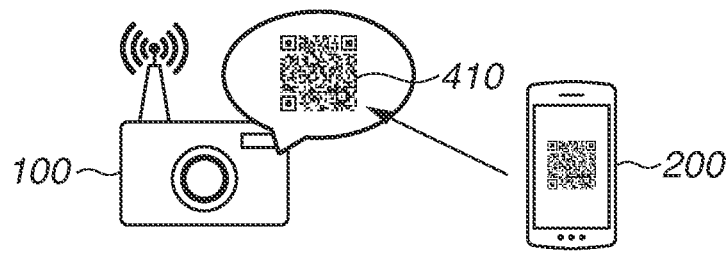

In FIG. 5D, the digital camera 100 generates a QR Code® 410 (i.e., a second two-dimensional code) from a URL for identifying the image data 300 to be transmitted and displays the QR Code® 410 on the display unit 106. In response to the display, the user operates the mobile phone 200 to re-start the camera app. Then, the user holds the image capturing unit 202 over the display unit 106 of the digital camera 100, thereby reading the QR Code® 410. The mobile phone 200 analyzes the read QR Code® 410 and recognizes the URL for displaying a content. Consequently, the state illustrated in FIG. 5D proceeds to a state illustrated in FIG. 5E.

Figure 5E:
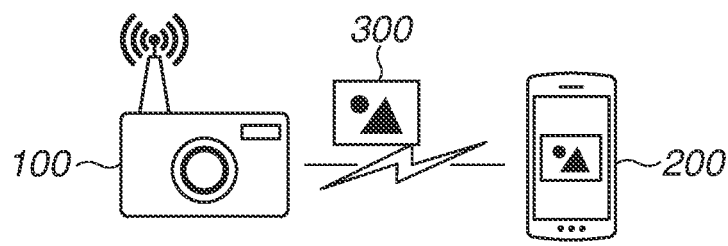

In FIG. 5E, using the recognition of the URL as a trigger, the mobile phone 200 automatically starts the browser app. Then, the mobile phone 200 accesses the recognized URL and displays the image data 300 as the content on a screen in a browser. When the display is performed, the digital camera 100 receives from the mobile phone 200 an acquisition request to acquire the image data 300 and transmits the image data 300 to the mobile phone 200. When a saving operation for saving the content as an operation on the browser is received, the content of the image data 300 is saved in the recording medium 207 of the mobile phone 200.

<Screen Transition of Digital Camera>

Next, the operation of the digital camera 100 for achieving an operation according to the present exemplary embodiment is described in detail.

Figure 6A:
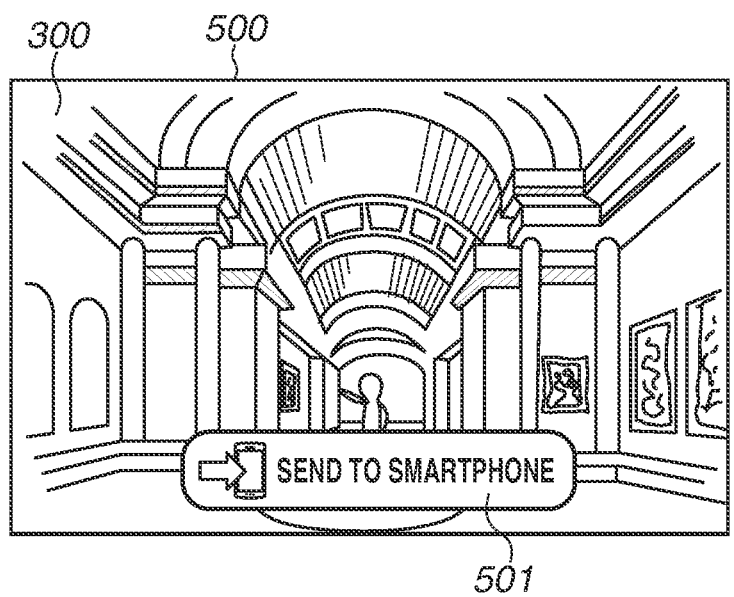
FIGS. 6A to 6C are examples of display screens of the digital camera according to the exemplary embodiment.
Figure 6B:
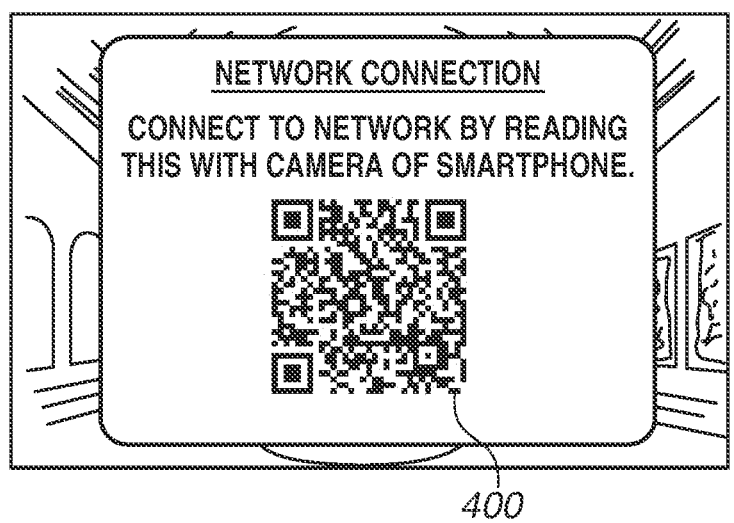
Figure 6C:
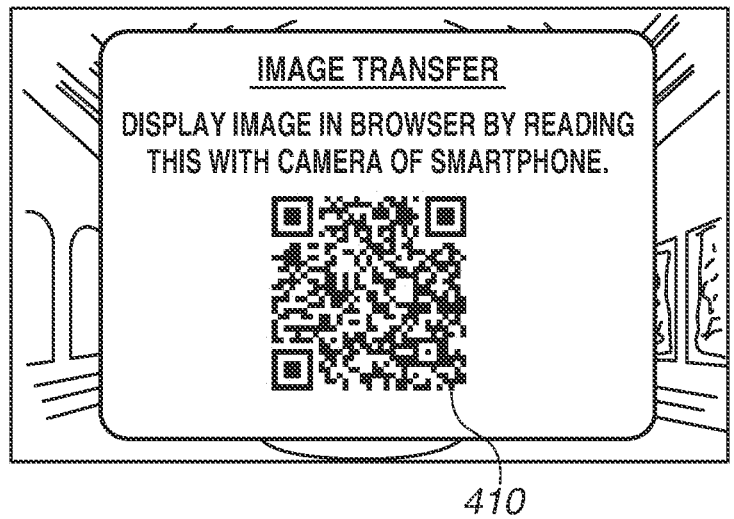

FIGS. 6A to 6C are examples of display screens representing screens displayed on the display unit 106 in the operation of the digital camera 100 according to the exemplary embodiment.

FIG. 6A is a screen displayed on the display unit 106 of the digital camera 100 illustrated in FIG. 5A. FIG. 6A illustrates a screen 500 where image data captured by the digital camera 100 and stored in the recording medium 110 is reproduced on the display unit 106, and the digital camera 100 receives a start instruction to start a transmission function for transmitting image data to a mobile phone (a smartphone). When a button 501 is touched, the digital camera 100 receives a start instruction to start transmitting image data 300 that is being displayed for reproduction to the mobile phone 200.

FIG. 6B is a screen displayed on the display unit 106 of the digital camera 100 illustrated in FIG. 5B. If the button 501 illustrated in FIG. 6A is touched, and the digital camera 100 receives the start instruction to transmit the image data 300, the digital camera 100 starts a simplified AP 120 and forms a wireless network. The digital camera 100 also generates a QR Code® 400 from network information regarding the simplified AP 120. Then, the digital camera 100 displays the generated QR Code® 400 on the display unit 106. In FIG. 6A, the button 501 for receiving a transmission instruction is placed on the screen where the image data 300 is displayed. Alternatively, a button for receiving a transmission instruction can be placed on a setting screen. Yet alternatively, a plurality of pieces of image data can be displayed, and the user can specify an image, whereby the digital camera 100 can automatically receive a transmission instruction.

FIG. 6C illustrates a screen displayed on the display unit 106 of the digital camera 100 in FIG. 5D. The digital camera 100 detects that the mobile phone 200 is connected to the Wi-Fi® network of the simplified AP 120 formed by the digital camera 100. Then, the digital camera 100 generates a QR Code® 410 based on a URL for displaying the content of the image data 300 to be transmitted. Then, the digital camera 100 displays the generated QR Code® 410 on the display unit 106. After receiving an acquisition request to acquire the image data 300 from the mobile phone 200 and transmitting the image data 300 to the mobile phone 200, the digital camera 100 can end the display of the QR Code® 410.

In order for the user to continuously select and transmit another piece of image data, after the QR Code® 410, which is based on the URL for displaying the content of the image data 300 to be transmitted, is closed, another image data is displayed and a button display portion, which is for redisplaying the QR Code® 410 based on the another image to be transmitted, can be placed in the screen 500.

A button for redisplaying the QR Code® 400 of the network information regarding the simplified AP 120 can be placed in the screen 500 or on a setting screen so that another mobile phone can simultaneously connect to the digital camera 100, and the digital camera 100 can transmit image data to another mobile phone.

<Operation of Digital Camera>

FIG. 7 is a flowchart illustrating the operation of the digital camera 100 according to the present exemplary embodiment. Processing illustrated in the flowchart is achieved by the control unit 101 of the digital camera 100 controlling the components of the digital camera 100 according to an input signal.

The flow illustrated in FIG. 7 is started when image data captured by the digital camera 100 and stored in the recording medium 110 is displayed on the display unit 106, and the digital camera 100 receives a start instruction for transmitting image data to the mobile phone 200.

In step S1001, the digital camera 100 waits until the user operates the digital camera 100 to specify image data 300 to be transmitted to the mobile phone 200, and the digital camera 100 receives a transmission instruction to transmit the image data 300. When the digital camera 100 receives the transmission instruction (Yes in step S1001), the processing proceeds to step S1002.

In step S1002, the digital camera 100 starts a simplified AP 120 and forms a wireless network.

In step S1003, the digital camera 100 generates a QR Code® 400 from network information regarding the simplified AP 120. In step S1004, the digital camera 100 displays the QR Code® 400 on the display unit 106.

In step S1005, the digital camera 100 waits for the mobile phone 200 to, using the QR Code® 400, connect to the Wi-Fi® network of the simplified AP 120 formed by the digital camera 100. If the digital camera 100 detects that the connection is established (Yes in step S1005), the processing proceeds to step S1006.

In step S1006, the digital camera 100 generates a QR Code® 410 from a URL for displaying the content of the image data 300 to be transmitted. In step S1007, the digital camera 100 displays the QR Code® 410 on the display unit 106.

In step S1008, the digital camera 100 waits for an acquisition request to acquire the image data 300 from the mobile phone 200. When the acquisition request is received (Yes in step S1008), then in step S1009, the digital camera 100 transmits the image data 300 to the mobile phone 200.

<Operation of Mobile Phone>

Next, the operation of the mobile phone 200 for achieving the operation according to the present exemplary embodiment is described in detail.

FIGS. 8A and 8B are flowcharts illustrating the operation of the mobile phone 200 according to the present exemplary embodiment. Processing illustrated in the flowcharts is achieved by the control unit 201 of the mobile phone 200 controlling the components of the mobile phone 200 according to an input signal and the OS.

The flowchart in FIG. 8A is started when the mobile phone 200 receives an instruction to execute the camera app.

In step S2001, the camera app installed on the mobile phone 200 starts and attempts to detect a QR Code® from an object in an image acquired by the image capturing unit 202. If the mobile phone 200 detects a QR Code® (Yes in step S2001), the processing proceeds to step S2002. In step S2002, the mobile phone 200 analyzes the detected QR Code®.

In step S2003, the mobile phone 200 recognizes the detected QR Code® by determining whether the detected QR Code® is Wi-Fi® network information or a URL for displaying a content.

If the detected QR Code® is recognized as Wi-Fi® network information, then in step S2004, the mobile phone 200 displays on the display unit 206 of the mobile phone 200 a confirmation message regarding whether to start connecting to the network. If the user performs the operation of agreeing to connect to the network, then in step S2005, the mobile phone 200 participates in the Wi-Fi® network of the simplified AP 120 formed by the digital camera 100 and establishes a wireless connection.

If the detected QR Code® is recognized as a URL for displaying a content, then in step S2006, the mobile phone 200 displays on the display unit 206 of the mobile phone 200 a confirmation message regarding whether to display the content in the browser. If the user performs the operation of agreeing to display the content in the browser, then in step S2007, the mobile phone 200 displays the image data 300 as the content on a screen in the browser based on the recognized URL.

If it is determined that the detected QR Code® corresponds to none of the above described pieces of information n, or a process according to the detected QR Code® is completed, then as illustrated in step S2008, the mobile phone 200 repeats the processes of steps S2001 to S2007 until the camera app is ended. The display of the QR Code® can be ended after the lapse of a certain time. Ending the display after the certain time prevents a third person from illicitly acquiring image data.

The flowchart illustrated in FIG. 8B is started when the mobile phone 200 receives an instruction to execute the browser app.

In step S2101, the mobile phone 200 acquires the URL read by the camera app in step S2007.

In step S2102, the mobile phone 200 displays the image data 300 as the content on the screen in the browser based on the read URL.

In step S2103, if an operation for saving the content is received on the browser from the user, then in step S2104, the mobile phone 200 saves the content in the recording medium 207 of the mobile phone 200.

As long as a mobile phone as a partner apparatus to which the communication apparatus according to the present exemplary embodiment transmits image data has a camera function and a function of reading and analyzing a two-dimensional code, the communication apparatus can transmit the image data to the mobile phone by the mobile phone simply reading two two-dimensional codes using a camera of the mobile phone. Thus, it is possible to easily transfer an image to the mobile phone without installing on the mobile phone a dedicated application for transmitting an image.

While exemplary embodiments have been described above, they are not seen to be limiting, and can be modified and changed in various manners within the scope of the present disclosure.

According to the above exemplary embodiment, it is possible to transmit image data from a camera to an information terminal without installing a dedicated application on the information terminal in advance.

Other Embodiments

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2018-103895, filed May 30, 2018, which is hereby incorporated by reference herein in its entirety.

What is claimed is:

1. A communication apparatus comprising:
   a communication device configured to form a direct wireless network connection with an external apparatus requesting an image data, in which the communication apparatus is an access point;
   a code generator configured to generate a two-dimensional code;
   a display device; and
   a controller,
   wherein the controller
   in a case where the controller detects a transmission instruction to transmit image data to the external apparatus, controls the communication device to form the direct wireless network connection in which the communication apparatus is an access point, controls the code generator to generate a first two-dimensional code indicating information for connecting to the formed wireless network, and controls the display device to display the first two-dimensional code, and
   in a case where the controller detects that the external apparatus connects to the wireless network using the first two-dimensional code, controls the code generator to generate a second two-dimensional code, the second two-dimensional code indicating information which causes the external apparatus to automatically start a browser so as to display the image data within the browser, and controls the display device to display the second two-dimensional code.

2. The communication apparatus according to claim 1, wherein the display device displays the image data, and
   wherein based on the image data displayed on the display device being specified, the controller recognizes the transmission instruction to transmit the image data to the external apparatus.

3. The communication apparatus according to claim 2, wherein the display device includes a touch panel, and
   wherein in a state where the image data is displayed on the display device, a touch operation is performed on the touch panel to specify the image data.

4. The communication apparatus according to claim 1, further comprising an image capturing device, wherein the display device displays image data obtained by the image capturing device.

5. The communication apparatus according to claim 1, wherein the display device,
   in a case where the display device displays the first two-dimensional code, produces display indicating that the first two-dimensional code is a code for connecting to the wireless network, and
   in a case where the display device displays the second two-dimensional code, produces display indicating that the second two-dimensional code is a code for transmitting an image.

6. The communication apparatus according to claim 1, wherein in a case where a certain time elapses after the two-dimensional code is displayed, the display device stops displaying the two-dimensional code.

7. The communication apparatus according to claim 1, wherein the information for connecting to the wireless network includes one or more of identification information regarding the wireless network, an encryption type, or a password.

8. The communication apparatus according to claim 1, wherein the information for accessing the image data includes a Uniform Resource Locator for identifying the image data.

9. The communication apparatus according to claim 1, wherein both the first and second two-dimensional codes are Quick Response Codes.

10. The communication apparatus according to claim 1, wherein the communication apparatus is a camera.

11. A communication method for a communication apparatus for transmitting image data to an external apparatus, the communication method comprising:
    detecting a transmission instruction to transmit image data;
    forming a direct wireless network connection with an external apparatus requesting an image data, where the communication apparatus is an access point, and generating a first two-dimensional code indicating information for connecting to the formed direct wireless network connection based on detection of the transmission instruction;
    displaying the first two-dimensional code;

detecting that the external apparatus connects to the direct wireless network using the first two-dimensional code;

generating, based on detection of the connection to the wireless network, a second two-dimensional code, the second two-dimensional code indicating information which causes the external apparatus to start a browser so as to display the image data within the browser; and displaying the second two-dimensional code.

12. A communication method for a communication apparatus for transmitting image data to an external apparatus, the communication method comprising:

forming, in a case where a transmission instruction to transmit image data is received from the external apparatus, a direct wireless network connection with the external apparatus where the communication apparatus is an access point;

generating a first two-dimensional code indicating information for connecting to the direct wireless network and a second two-dimensional code indicating, the second two-dimensional code indicating information which causes the external apparatus to automatically start a browser so as to display the image data within the browser; and displaying the first and second two-dimensional codes so that the external apparatus can read the first and second two-dimensional codes.

13. A non-transitory computer-readable storage medium storing a computer executable program for causing a computer to execute communication method for a communication apparatus for transmitting image data to an external apparatus, the communication method comprising:

detecting a transmission instruction to transmit image data;

forming a direct wireless network connection with the external apparatus where the communication apparatus is an access point, and generating a first two-dimensional code indicating information for connecting to the formed direct wireless network connection based on detection of the transmission instruction;

displaying the first two-dimensional code;

detecting that the external apparatus connects to the direct wireless network using the first two-dimensional code;

generating, based on detection of the connection to the wireless network, a second two-dimensional code, the second two-dimensional code indicating information which causes the external apparatus to automatically start a browser so as to display the image data within the browser; and displaying the second two-dimensional code.

\* \* \* \* \*